(12) United States Patent
Cherry et al.

(10) Patent No.: US 10,586,232 B2
(45) Date of Patent: Mar. 10, 2020

(54) PREVENTION OF UNAUTHORIZED USAGE OF PERSONAL DEVICE AND SYSTEM WITH BIOMETRIC SENSOR

(71) Applicant: Peter Cherry, Queensland (AU)

(72) Inventors: Peter Cherry, Queensland (AU); Aaron Cope Maher, Keysborough (AU); Dion Jaye Maher, Keysborough (AU)

( * ) Notice: Subject to any disclaimer, the term of this patent is extended or adjusted under 35 U.S.C. 154(b) by 870 days.

(21) Appl. No.: 14/417,016

(22) PCT Filed: Jul. 26, 2013

(86) PCT No.: PCT/AU2013/000834
§ 371 (c)(1),
(2) Date: Jan. 23, 2015

(87) PCT Pub. No.: WO2014/015386
PCT Pub. Date: Jan. 30, 2014

(65) Prior Publication Data
US 2015/0206148 A1 Jul. 23, 2015

(30) Foreign Application Priority Data

Jul. 26, 2012 (AU) .................................. 2012903212
Apr. 12, 2013 (AU) .................................. 2013204744

(51) Int. Cl.
*G06K 19/07* (2006.01)
*G06Q 20/34* (2012.01)
(Continued)

(52) U.S. Cl.
CPC ....... *G06Q 20/40145* (2013.01); *G06F 21/32* (2013.01); *G06F 21/35* (2013.01);
(Continued)

(58) Field of Classification Search
CPC ......... G06Q 20/40145; G06K 19/0718; G06K 19/07354; G06K 9/0002; G06F 3/044; G06F 3/046
(Continued)

(56) References Cited

U.S. PATENT DOCUMENTS 4,582,985 A  4/1986 Lofberg
5,229,764 A  7/1993 Matchett
(Continued)

FOREIGN PATENT DOCUMENTS

CN  201465142 U * 5/2010
WO  2006014205 A2  2/2006
(Continued)

OTHER PUBLICATIONS

English equivalent machine translation of CN 201465142, retrieved Oct. 29, 2018, European Patent Office, <http://translationportal.epo.org/emtp/translate/?ACTION=description-retrieval&COUNTRY=CN&ENGINE=google&FORMAT=docdb&KIND=U&LOCALE=en_EP&NUMBER=201465142&OPS=ops.epo.org/3.2&SRCLANG=zh&TRGLANG=en>.*
(Continued)

*Primary Examiner* — Suezu Ellis
(74) *Attorney, Agent, or Firm* — Millen, White, Zelano & Branigan, P.C.; William Nixon

(57) ABSTRACT

The present invention is directed to a data card. The data card includes a biometric sensor, at least one processor wherein the at least one processor is operable on contact by a user with said biometric sensor whereon said processor is adapted to obtain a reading from the biometric sensor to verify that the user is an authorised user and prohibit further card usage in the event that the user is not an authorised user.

12 Claims, 8 Drawing Sheets

(51) Int. Cl.
*G06Q 20/40* (2012.01)
*G06F 21/32* (2013.01)
*G06F 21/35* (2013.01)

(52) U.S. Cl.
CPC ....... *G06K 19/0718* (2013.01); *G06Q 20/341* (2013.01); *G06Q 2220/00* (2013.01)

(58) Field of Classification Search
USPC ........... 235/492, 382; 340/572.1, 5.52, 5.82, 340/5.83; 382/115, 116, 124, 125, 127
See application file for complete search history.

(56) References Cited

U.S. PATENT DOCUMENTS

| | | | |
|---|---|---|---|
| 5,719,950 A | | 2/1998 | Osten et al. |
| 5,872,834 A * | | 2/1999 | Teitelbaum ............. H04M 1/66 379/110.01 |
| 8,130,078 B2 | | 3/2012 | Tassy et al. |
| 8,219,495 B2 * | | 7/2012 | Niwa ................ G06Q 20/0855 340/5.53 |
| 10,474,621 B2 * | | 11/2019 | Zhang ................ G06K 9/00046 |
| 2002/0145507 A1 * | | 10/2002 | Foster ................ G07C 9/00563 340/5.53 |
| 2004/0129787 A1 * | | 7/2004 | Saito ...................... G06K 19/07 235/492 |
| 2004/0133787 A1 | | 7/2004 | Doughty et al. |
| 2004/0221183 A1 * | | 11/2004 | Lu ......................... G06F 1/1626 713/300 |
| 2005/0240778 A1 | | 10/2005 | Saito |
| 2006/0000894 A1 * | | 1/2006 | Bonalle ................. G06K 19/07 235/380 |
| 2006/0213970 A1 * | | 9/2006 | Trajkovic ................ G06F 21/32 235/380 |
| 2007/0186116 A1 * | | 8/2007 | Clemmensen .......... G06F 21/32 713/186 |
| 2007/0198712 A1 | | 8/2007 | Mani et al. |
| 2008/0120509 A1 | | 5/2008 | Simon |
| 2008/0148393 A1 | | 6/2008 | Wendt |
| 2008/0223925 A1 * | | 9/2008 | Saito ..................... G06Q 20/341 235/380 |
| 2009/0150994 A1 | | 6/2009 | Evans |
| 2010/0039234 A1 * | | 2/2010 | Soliven ..................... H04B 5/02 340/10.1 |
| 2010/0071031 A1 | | 3/2010 | Carter |
| 2011/0107416 A1 * | | 5/2011 | Poo ......................... G06F 21/32 726/19 |
| 2012/0218079 A1 * | | 8/2012 | Kim ........................ G06F 21/32 340/5.83 |
| 2012/0286847 A1 * | | 11/2012 | Peshkin .................. G06F 3/016 327/517 |
| 2013/0106769 A1 * | | 5/2013 | Bakken .................... G06F 3/044 345/174 |
| 2013/0207786 A1 | | 8/2013 | Hutzler et al. |
| 2014/0089243 A1 | | 3/2014 | Oppenheimer |
| 2014/0232525 A1 * | | 8/2014 | Mohmedi .......... A61B 5/02427 340/5.83 |
| 2015/0294312 A1 * | | 10/2015 | Kendrick ............... G06Q 20/40 705/44 |
| 2017/0006223 A1 * | | 1/2017 | Hargreaves ............. G06K 9/38 |
| 2017/0272421 A1 | | 9/2017 | Murakami et al. |
| 2017/0293749 A1 * | | 10/2017 | Baek ..................... G06F 1/3265 |

FOREIGN PATENT DOCUMENTS

| | | |
|---|---|---|
| WO | 2007022423 A2 | 2/2007 |
| WO | 2007110142 A1 | 10/2007 |
| WO | 2009076525 A1 | 6/2009 |
| WO | 2010105250 A2 | 9/2010 |

OTHER PUBLICATIONS

Australian Search Report dated Jul. 19, 2013 for Australian Application No. 2013204744 filed Jul. 26, 2012.
Co-pending application Publication No. WO2015/109360 A1, International Application No. PCT/AU2015/000026 with International Search Report, filed Jan. 21, 2015.
European Search Report dated Jan. 4, 2016 for European Application No. 13823666 filed Jul. 26, 2013.
English translation of Japanese Search Report dated Mar. 15, 2016 for Japanese Application No. 2015-523346 filed Jul. 26, 2013.
European Search Report dated Aug. 10, 2017 from co-pending European Application No. 15741074 filed Jan. 21, 2015.

* cited by examiner

PREVENTION OF UNAUTHORIZED USAGE OF PERSONAL DEVICE AND SYSTEM WITH BIOMETRIC SENSOR

TECHNICAL FIELD

The present invention relates to systems and methods for fraud prevention. In particular although not exclusively the present invention relates to system and methods for fraud prevention utilising a secure card.

BACKGROUND ART

Presently smart cards can be classified into two main groups, contact and contactless. Contact, as the name suggests, requires some form of physical prolonged contact with the reader to permit use of the card. Contactless cards by contrast simply use an RF source to energise the card to facilitate data transfer between the reader and the card without the need for physical contact with the reader.

Since their development, smart cards have been utilised in a variety of applications including finance, identification, healthcare, transport and security etc. In many of these applications, personal or other sensitive information is often recorded to the card. The card's ability to store such sensitive information has proven a popular target of criminal activity. One of the most popular forms of crime utilising data skimmed from cards is that of identity theft. In the US, the total value of identity fraud for 2003 alone was US$47.6 billion. In the United Kingdom, the Home Office reported that identity fraud costs the UK economy £1.2 billion annually. In Australia, identity theft was estimated to be worth between A$1 billion and A$4 billion per annum in 2001.

Often instances of identity theft result from details being acquired from an individual's credit card through skimming the card or via hacking of websites etc. to obtain the information. More often than not, most individuals do not realise that they have been the target of an attack until they are notified by the credit card company or their banking institution.

More recently, the introduction of tap and go or automatic processing of the transaction for purchases under a certain denomination without requiring identification or the input of a pin etc. has again made credit cards an attractive target for opportunistic criminals.

In view of the issues with card security, various counter measures have been proposed. One example of a counter measure which has been employed to prevent card fraud is discussed in WO 2009/076525 entitled "Biometric Access Control Transactions" to Visa Inc. This document discusses the use of biometric security measures to verify the identity of the card user during a transaction. In the event that the biometric information does not match that of the card owner, the card is temporarily deactivated. If subsequent attempts are made to utilise the card without the correct biometric data, the card is permanently deactivated.

Another example of the use of biometric security measures to further enhance card security is disclosed in WO 2007/110142 to Borracci et al. The Borracci document discusses the use of a smart card incorporating a biometric reader such as a finger print reader. At activation of the card, generation of the absolute biometric identification data of the authorised user is carried out, said biometric data being stored in on said card in a form that cannot be read or utilised outside said card. In addition to the generation and storage of biometric identification data, the user access code is also encoded onto the card during initial activation. When the card is utilised for a transaction, the biometric data from the reader is compared with absolute biometric identification data. The user is also required to enter the access code. If the biometric data or the access code fails to match the stored data, the card is being allowed in order to continue regular working operation. Thus, under the system of Borracci, two pass authentication is utilised in order to access the card's higher functions.

A further example of a smart card employing the use of additional security measures is discussed in U.S. Pat. No. 8,130,078 entitled "RFID Badge with Authentication and Auto Deactivation functions" to IBM. The document discusses a radio frequency identification (RFID) badge which includes a card having an authentication data acquisition and/or input device configured to receive inputted data unique to a holder of the card, including at least one of fingerprint data and a combination of fingerprint data and alpha-numeric code data, from the holder. The card also includes an RFID tag having external system access information stored thereon which is readable for access granting only when the RFID tag is activated and which is unreadable when the RFID tag is deactivated. A controller is configured to conduct an identification algorithm, during which the inputted data is compared with stored data, to thereby confirm that the holder is authorized to do so and to activate the RFID tag for a predetermined time upon such confirmation or to otherwise deactivate the RFID tag. The card includes a clip which is designed to permit operation of the card when the mating parts of the clip are disengaged i.e. the card must be worn or the clip forced open to permit the card's processor etc. to be powered up by the on-board power source.

As can be seen, the above system utilises some form of biometric security to permit access to the card's higher order functions. While this does provide increased security, it is still possible to circumvent these measures and gain access to the card's higher functions. Indeed, the ability to circumvent the biometric security measures is contemplated in U.S. Pat. No. 8,130,078. While a number of systems do employ the use of a secondary step to complete a transaction with the card, the use of a secondary step still exposes the card to an attack. That is, once the biometric security measure is circumvented, the card is activated, opening up the card to hacking.

Clearly, it would be advantageous to provide an apparatus, system and method which would mitigate the risks of card hacking and which would prevent the unauthorised use of personal data to complete a transaction. It would also be advantageous to provide a system and method wherein the risk of the misappropriation of personal data during such data exchanges is minimized.

SUMMARY OF INVENTION

Accordingly, in one aspect of the present invention there is provided a data card, said card including:
a biometric sensor;
at least one processor wherein the at least one processor is operable on contact by a user with said biometric sensor whereon said processor is adapted to obtain a biometric sample from the biometric sensor to verify that the user is an authorised user and prohibit further card usage in the event that the user is not an authorised user.

In a further aspect of the present invention, there is provided data card, said card including:
a biometric sensor;

a power unit;

at least one processor;

wherein the power unit is energised by the processor on contact by a user with said biometric sensor and whereon said processor is adapted to obtain a biometric sample from the biometric sensor to verify that the user is an authorised user and disable the power unit to prevent card usage in the event that the user is not an authorised user.

Suitably, the card's biometric sensor is a finger print scanner. The finger print scanner preferably includes an inductive element for the generation of an electrical charge when the inductive element is in proximity to the user's finger. Alternatively, the inductive element may be adjacent to the finger print scanner. The inductive element is coupled to the power unit to provide charge to enable the power unit to provide a supply voltage to the processor. The power unit may include at least one voltage and/or current amplifier to boost the charge induced by the inductive element. Alternatively, the finger print scanner may include or be associated with a capacitive element for generating and/or detecting an electrical charge. The capacitive element may be coupled to the power unit. In other embodiments of the invention, the finger print scanner may include or be associated with a resistive element. The resistive element may detect a bio-signal received from the user's finger.

Alternately, the biometric sensor may be a suitable device for obtaining a biometric sample e.g. iris scanner for retina/iris identification, camera for facial recognition, microphone for voice print verification.

Preferably, the processor verifies the user's/subscriber's identity by comparing fingerprint data obtained from the finger print scanner with template data obtained from the authorised user. Suitably, the template data is stored locally on the processor in an encrypted format.

The card may also include a memory module coupled to the processor. The memory may contain personal data associated with the authorised user such as driver license details, passport number, banking data, store loyalty programs, etc. In such instances, the processor is adapted to run one or more applications associated with a particular data type to configure the card for a particular transaction.

The card may be provided with a communications module coupled to the processor. The communications module may be utilised to communicate with third party service providers. Suitably, the processor is adapted to transmit the sample data via the communications module on an initial match to the card's issuing authority for secondary verification before enabling the card's higher functions.

In one embodiment, the processor is adapted to transmit the biometric sample via the communications module to a mobile device or personal computer. The communications module may include a wireless transmitter. The wireless transmitter may be a Wi-Fi transmitter. The wireless transmitter may operate according to IEEE standard 802.11.

The card may further include a biosignal detection circuit for detecting the user's contact with the biometric sensor.

Suitably, the user is required to maintain contact with the card to utilise the card to complete the desired transaction.

According to another aspect of the invention, there is provided a data card including:

one or more biometric sensors;

at least one processor wherein the at least one processor is operable on contact by a user with said one or more biometric sensors whereon said processor is adapted to obtain one or more readings from the one or more biometric sensors to verify that the user is an authorised user and prohibit further card usage in the event that the user is not an authorised user.

In yet another aspect of the present invention, there is provided a system for the secure transfer of information for a plurality of subscribers, the system including:

a central server and a plurality of data cards wherein each data card is associated with a subscriber on registration with the system, each card including a biometric sensor and at least one processor and wherein the server is adapted to:

obtain a biometric sample for a given subscriber;

generate from the biometric sample template data for the given subscriber;

encrypt the template data write the encrypted template data to the card's processor wherein the card's processor is operable on contact by a user with said biometric sensor whereon said processor is adapted to obtain a biometric sample from the biometric sensor to verify that the user is the subscriber associated with the card and prohibit further card usage in the event that the user is not the subscriber who was issued the card and whereon verification the user is the subscriber associated with the card transmits the sample data to the central server for secondary validation.

According to a further embodiment of the invention, there is provided a system for the secure transfer of information for a plurality of subscribers, the system including:

a central server and a plurality of data cards wherein each data card is associated with a subscriber on registration with the system, each card including a biometric sensor and at least one processor, and wherein the at least one processor is adapted to:

obtain a biometric sample for a given subscriber;

generate from the biometric sample template data for the given subscriber;

encrypt the template data;

transmit the encrypted template data to the central server;

wherein the card's processor is operable on contact by a user with said biometric sensor whereon, said processor is adapted to obtain a biometric sample from the biometric sensor to verify that the user is the subscriber associated with the card and prohibit further card usage in the event that the user is not the subscriber who was issued the card.

Suitably, generation of the template data includes obtaining an image of a fingerprint from a subscriber; smoothing the image of the selected digit and creating a binary image of the print; thinning the binary image prior to performing ridge reconstruction on the image. The image may undergo further processing to produce a template based on the image recognition technique being utilised. In the case where minutiae matching is utilised, the image undergoes minutiae extraction. The minutiae information is then stored as the template.

The reference to any prior art in this specification is not, and should not be taken as an acknowledgement or any form of suggestion that the prior art forms part of the common general knowledge.

BRIEF DESCRIPTION OF DRAWINGS

In order that this invention may be more readily understood and put into practical effect, reference will now be made to the accompanying drawings, which illustrate preferred embodiments of the invention, and wherein.

DESCRIPTION OF EMBODIMENTS

Figure 1:
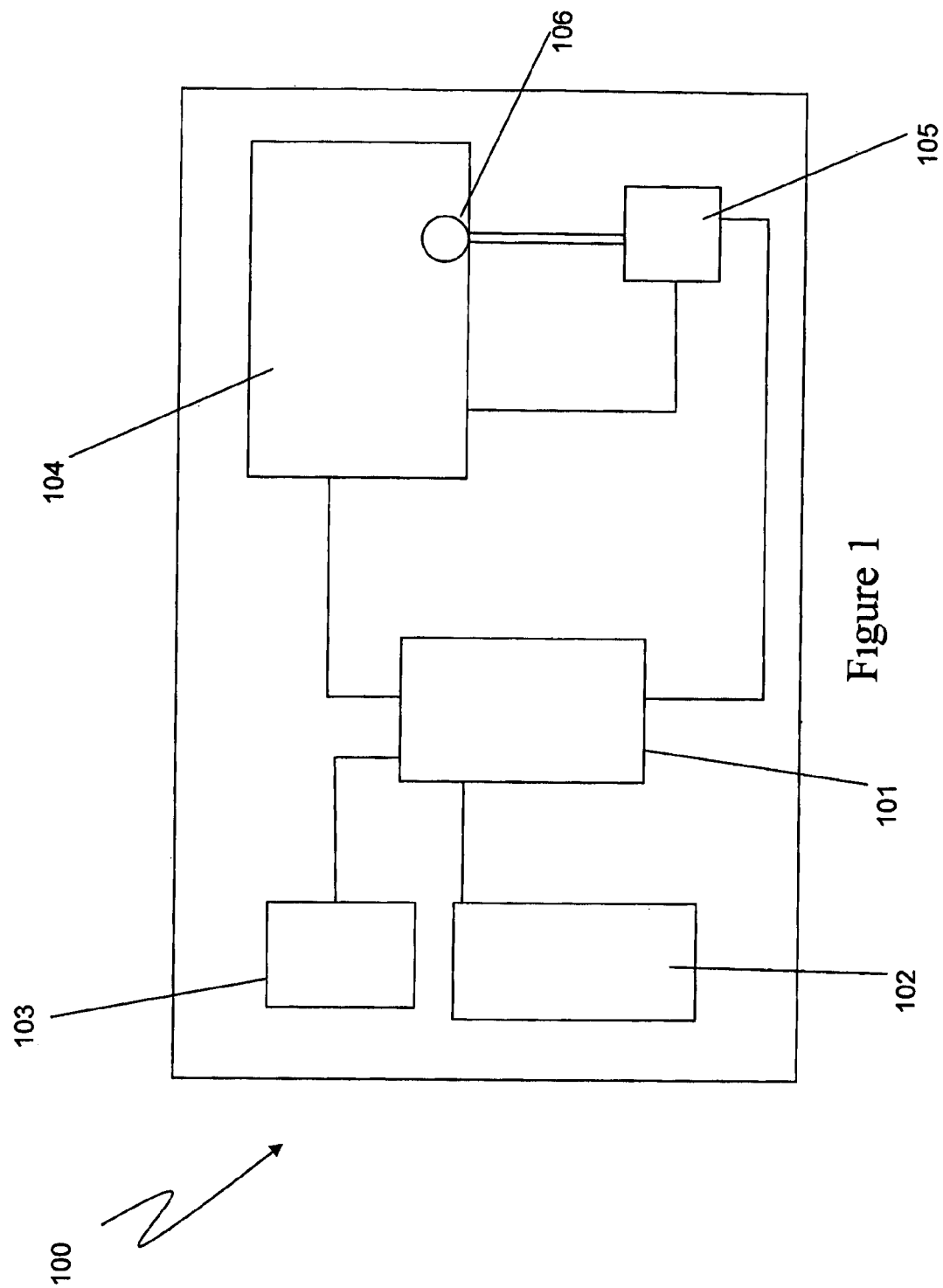
FIG. 1 is a schematic diagram depicting the configuration of a smart card according to one embodiment of the present invention.

With reference to FIG. 1, there is illustrated one possible configuration of a smart card 100 according to one embodiment of the present invention. As shown, the card includes a central processor 101 coupled to a memory module 102 and a communications module 103. The card also includes a biometric sensor 104 for obtaining biometric data from the card user.

As shown, each of the modules is coupled to a power unit 105. The power unit 105 is normally an open circuit when there is no contact by a user with the biometric sensor 104. Consequently, the card is deactivated until such time as a user interfaces with the biometric sensor 104. In this example, the biometric sensor is in the form of a fingerprint reader. In order to activate the card, the user is required to place a nominated digit on to the biometric sensor/fingerprint reader 104. Once contact is made the power unit 105 is set to closed circuit permitting the card's processor to be powered up. While it may initially seem that the contact of the user with the biometric sensor/fingerprint reader 104 does little more than complete the circuit to enable activation of the card, the user's interfacing with the biometric sensor/fingerprint provides the current to power the card.

As will be appreciated by those of skill in the art, the human body is capable of generating electrical energy often referred to as the electrokinetic phenomena. It has been established the mammalian blood cell carries a surface charge which is proportional to the electric mobility of the cell. As the charged cells are passed around the circulatory system, the induced current produce a small varying magnetic field which can be harnessed to induce an electrical charge in order to power the card. The principle in this instance is not unlike the concept of an inductive charger presently utilised in inductive charges.

In the present example, the body's natural charge and magnetic field are utilised to induce a charge in a small inductive element 106 disposed with the biometric sensor/fingerprint reader 104. Once the inductive element is charged, the stored energy can then be utilised to power the other elements of the card. As will be appreciated by those of skill in the art the current generated by the inductive element will be relatively small; consequently the power unit may include current and voltage amplifiers to boost the energy generated from the inductive element 106 to a level suitable for the operation of the various components.

On activation, the central processor obtains the fingerprint data from the user and compares the information with the information stored on the card relating to the authorised holder of the card. The identification data of the authorised user may be stored within the on-board memory of the processor or on the memory module 102. In the case where the information is on the memory module 102, the processor powers the memory module directly in order to extract the required data to perform the matching operation. In most cases, given the power consumption, it is likely that the data will be stored within local memory of the processor.

Figure 2:
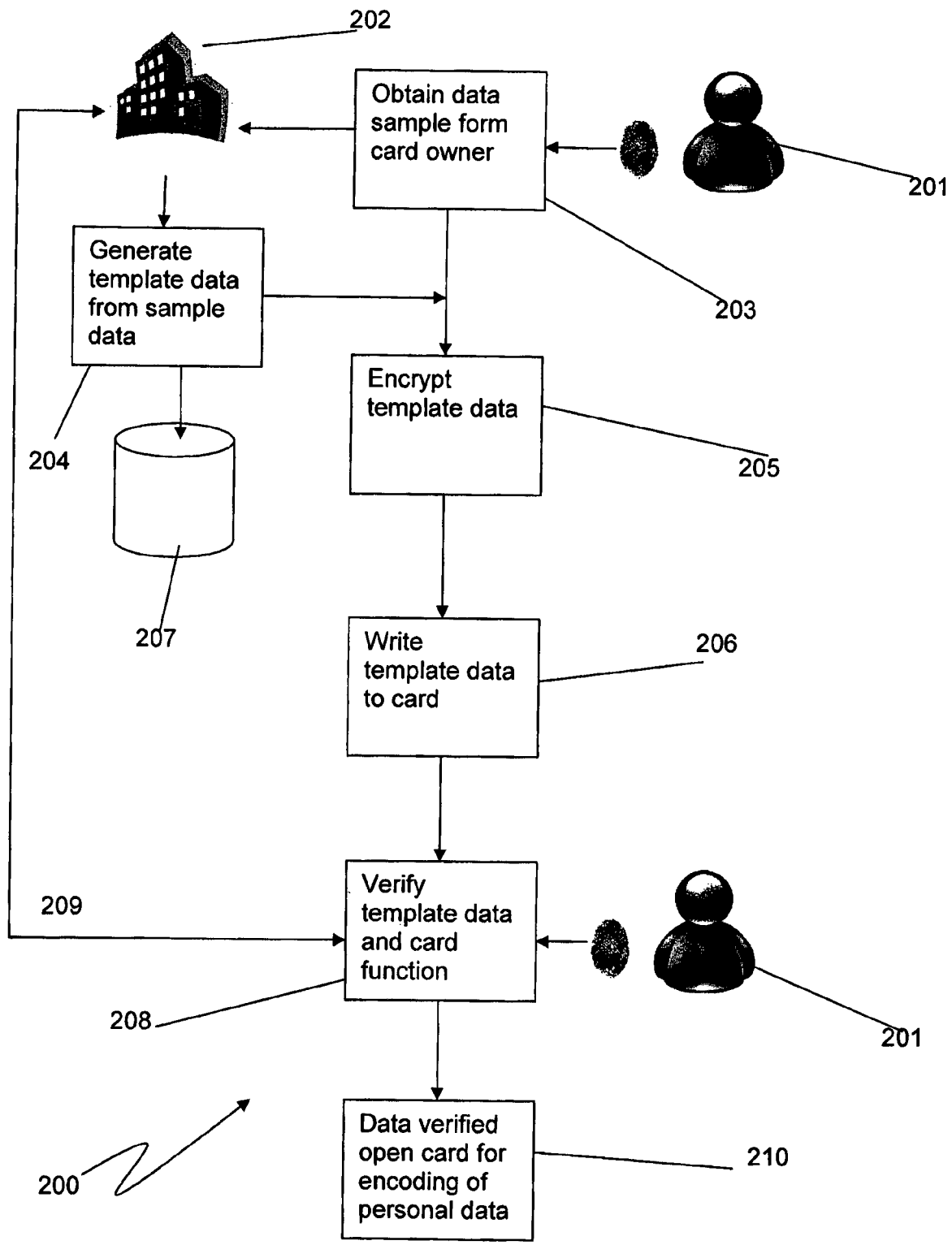
FIG. 2 is a flow chart depicting the initial encoding of the card of FIG. 1 during the issuing phase.

FIG. 2 depicts the process steps involved during the initial encoding 200 of the card for a specific individual 201. As shown, the card owner/authorised user is required to present themselves to the card issuing authority or a branch of the issuing authority 202. The issuing authority 202 then obtains a biometric sample 203 for purposes of linking the card with the card owner/authorised user 201. As noted above, the biometric sample in this particular example is a fingerprint sample; however it will of course be appreciated by those of skill in the art that other forms of biometric identification could be utilised to verify the authorised user, for example retina/iris identification or facial recognition could be implemented in the card via the use of a CCD camera or the like. Likewise, voice recognition could be utilised as a form of biometric security via the inclusion of a microphone on board the card.

Once the relevant sample is collected, a digital template of the biometric information is compiled 204. The template data is then encrypted 205 before being written to the card 206. In the case of a fingerprint, the encryption process 202 includes firstly smoothing the image of the selected digit, a binary image of the print is then generated. The binary image then undergoes thinning to further sharpen the image. Once the thinning process is complete the ridge reconstruction is performed. The further processing of the image to produce a template image is dictated based on the image recognition technique being utilised.

Presently, there are two main forms of template recognition techniques utilising pattern matching and minutiae feature matching. With pattern based algorithms, the template contains the type, size and orientation of patterns within the aligned fingerprint image. The candidate fingerprint image is graphically compared with the template to determine the degree to which they match. Minutiae feature matching analyses the geometric characteristics such as distance and angle between standard minutiae and its neighbouring minutiae based on the analysis of the image-processed feature data. After the analysis, all the minutiae pairs have some kind of geometric relationship with their neighbouring minutiae, and the relationship will be used as basic information for local similarity measurement In the case where pattern matching is to be utilised, the thinned and reconstructed image is utilised as the template image. In the case where minutiae feature matching is utilised the thinned and reconstructed image undergoes minutiae extraction where the geometric relation between neighbouring minutiae is utilised to produce a series of characteristic points within the image; this data is then stored as a series of values. During the verification stage, these values for the template image are compared against the minutiae values computed for the sample image. Given that the card is a resource constrained device, the use of minutiae comparison is the preferred form of comparison as it is less resource intensive.

Once the template image for the card owner is compiled 204 it is then stored to the issuing authority's database 207 before being encrypted 205 and written to the card's central processor 206. Once the data is written to the card 206, the owner 201 is then required to activate the card by verifying the recorded fingerprint data 204. In this case, the user is required to place the sampled finger onto the card's biometric sensor 104. The application of the finger powers the card and permits the card to take a sample of the print. The sensor in this case could simply obtain a raw image of the print which is then passed to the processor for further processing i.e. binarisation, thinning, ridge reconstruction and minutiae extraction. Alternatively, some of the processing of the sample could be performed within the sensor which then simply passes the series of the minutiae values for the sample image for further processing.

The obtained sample is then compared by the processor against the template image 208. In the event that the processor is unable to verify the print data, the processor disables the power to the card preventing its further use. Alternatively, functionality of the card may be disabled via software. If the processor determines that there is a match the processor then initiates a handshake operation 209 with the issuing authority's backend systems. The handshake operation 209 essentially involves the processor transmitting the encrypted print data to the issuing authority for secondary verification. In this case, the processor enables the card's communication module and transmits the print data and card ID data to the issuing authority and awaits a reply. On receipt of the data, the issuing authority then compares the data with the original template data for the owner associated with the card ID. Once the system has verified the sample data, a confirmation signal is then sent back to the card 210 to enable the processor to grant access to the card's higher order functions. In the present example, the input of the biometric sample is purely performed to verify the card's operation, the transmission of the confirmation signal is not strictly required.

Once the operation of the card has been verified, the issuing authority can then encode the relevant personal information 211 onto the memory 102. For example, if the user wishes to utilise the card as a financial service card i.e. credit, debit or store card, etc. the system encodes the relevant account information to the card to enable the processor to access the relevant financial institution to complete the transaction. It will of course be appreciated by those of skill in the art that the card could be encoded with other personal data such as driver's license and passport information; Medicare and other government records such as taxation and centerlink records, etc; medical records such as personal health records, medical insurance/benefits etc. Consequently, the card can be configured as a single purpose card or multipurpose card as required.

Figure 3:
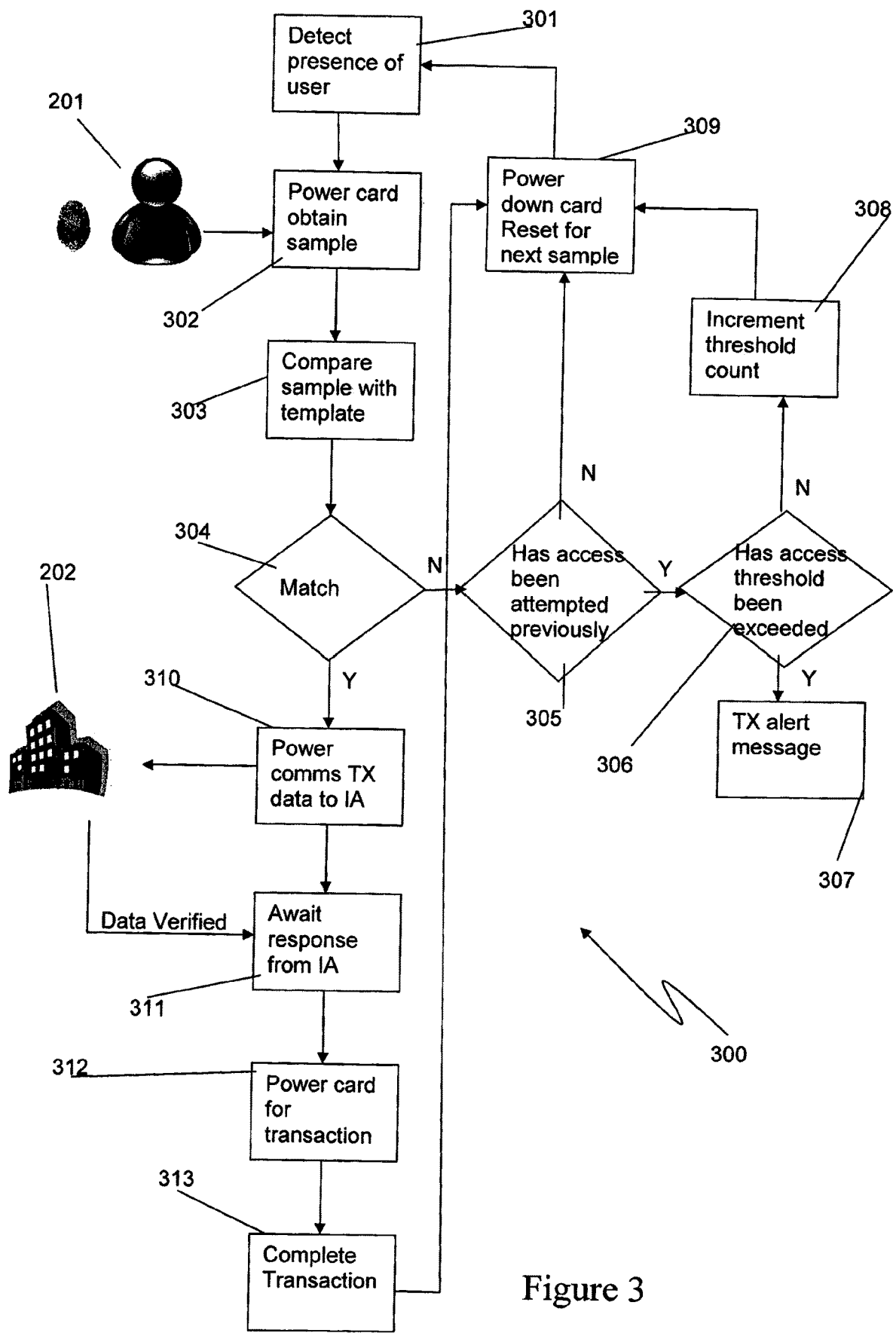
FIG. 3 is a flow chart depicting the process for activation of the card of FIG. 1 during a transaction according to one embodiment of the present invention.

With reference to FIG. 3, there is illustrated the process for activation of the card during a transaction 300 according to one embodiment of the present invention. As shown, the user is required to make contact 301 with the biometric sensor 104 to power the card. As noted above, powering of the card relies on the production of electrical current due to fluctuations in the magnetic field induced by blood circulating through the appendage, thus, unlike most conventional systems which can be circumvented by the use of a synthetic version of the print or the use of the severed/dead appendage. Once a live appendage is engaged with the reader, the card's processor is powered up and the finger print data obtained from the user is obtained 302. The data is then compared with the template data of the card owner 303 to determine if the user presently engaged with the card is the card owner.

As noted above, the sample data is compared against the template data by comparing the minutiae values calculated for the sample with the values of the card owner's template to determine a match 304. If the processor determines that the sample data does not match the template data, the processor then determines if the sample has been previously used to attempt to access the card 305. If the sample has been previously utilised, the processor determines the number of times access to the card has been attempted 306. If the number of attempts to access the card is above a pre-set threshold, the processor transmits via the communications module an alert message to the issuing authority advising of a possible breech 307. If the number of attempts is below the pre-set threshold the processor updates the threshold count 308 and powers down 309 the power unit 105. The power unit will remain powered down until removal of the finger from the biometric sensor 104. In this instance, the removal of the finger can be determined by a drop in current supplied from the charging circuit disposed in the biometric sensor. Once the finger is removed, the power unit is reset for normal operation.

In the present example, the card allows for a set number of retries to operate the card to accommodate for slight errors in the reading of the sample data of the bona fide owner of the card. Such errors can be introduced due to damage to the individual's print e.g. lacerations etc. In some cases the bona fide owner may inadvertently use the wrong finger to access the card. To prevent unintentional deactivation of the card, the issuing authority on receipt of the breech notice may send out an advisory message via sms, email etc. to the card owner requesting they contact the issuing authority. In one embodiment, the owner could be requested to transmit a pin code to the issuing authority to confirm that they are presently attempting to access the card. On confirmation from the card owner that they are accessing the card, the issuing authority may signal the processor to re-sample the print data to verify the user's identity.

In the event that the processor is unable to resolve the identity of the card user then the processor may temporarily deactivate the card, at which time the bona fide owner will be required to present themselves and the card to a branch of the issuing authority to reinitialise the card.

If at step 304 a match between the sample and the template is determined, the processor then opens up a channel to the issuing authority and transmits the sample data to the issuing authority 310 which then compares the data against the original template data used to encode the card. Utilising this secondary verification with the issuing authority lowers the risk of a false positive due to corruption of the data on the card. In the event that the issuing authority determines that the sample is not a match the issuing authority signals the processor which then powers down the card as per step 306, 30, 308 discussed above. In the event that the comparison at the issuing authority's end is in agreement with the initial match made by the processor, the issuing authority signals the processor 311 at which time the processor initialises the required card resources and functions required to complete the desired task 312. Once the task is complete, the processor deactivates the card's resources and proceeds to shut down the power unit 309. The power unit is then re-set for normal operation once the user has removed their finger from the sensor.

Figure 4:
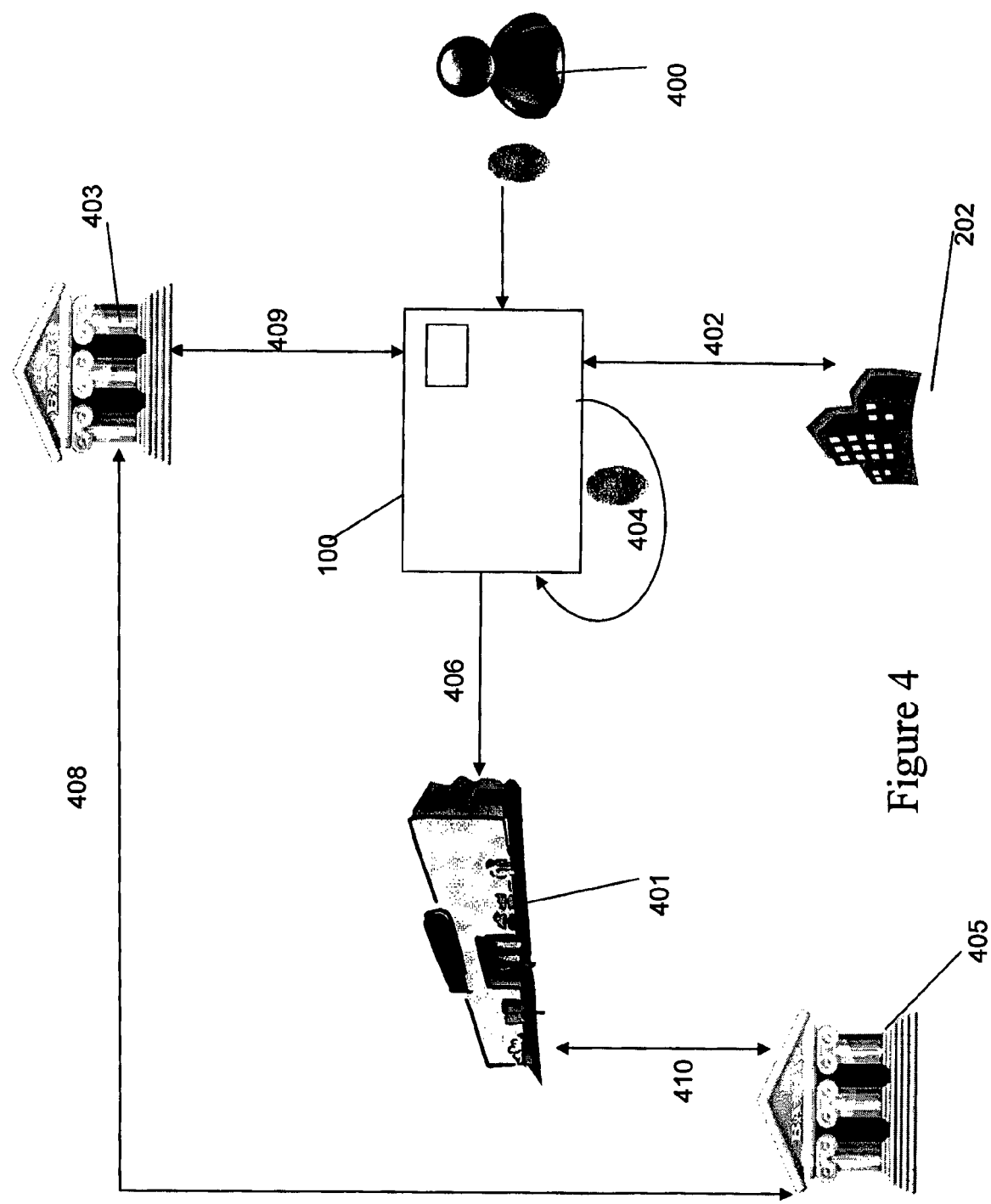
FIG. 4 is a schematic diagram depicting the use of the card in the conduct of a financial transaction.

With reference to FIG. 4, there is illustrated a schematic depicting the use of the card to effect a financial transaction between a user 400 and merchant 401. As shown, the user 400 on deciding to conduct a transaction with the merchant 401 activates the card 100. The card then verifies the user's identity 404 and performs second stage verification (handshake) with the card issuing authority (IA) 402. Once the user has been verified, the card is then ready to be utilised to initiate the transaction 406. Once the transaction is initiated, the transaction details and card details are verified 409 with the user's financial institution 403.

Once the user's financial institution has verified the transaction and card details, the user's financial institution 403 then initiates settlement 408 with the merchant's financial institution 405. On completion of the transaction, the merchant's financial institution 405 advises the merchant 410 who then releases the goods etc. to the user. At this point, the connection between the card and the merchant's systems is then terminated and the card is then powered down.

Figure 5:
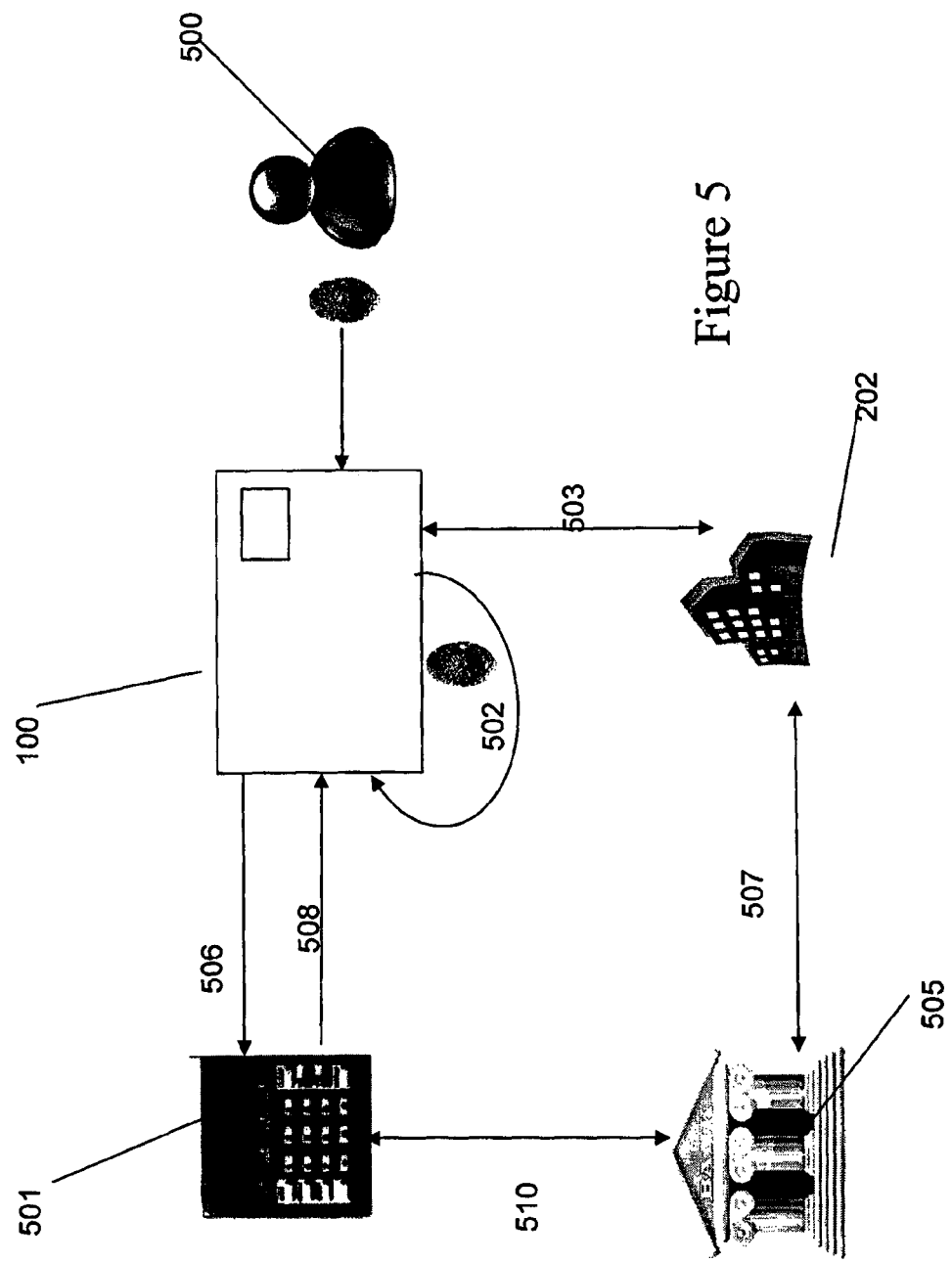
FIG. 5 is a schematic diagram depicting the use of the card as a form of identification or access card.

FIG. 5 depicts the use of the card as a form of identity such as driver's license, passport, security card, access card etc. As in the above example, user 500 is firstly required to activate the card 100 by placing their finger onto the biometric sensor/reader 104. The card then verifies the user's identity 502. In the event of an initial match the fingerprint data is forwarded by the card's processor to the issuing authority 503 for secondary verification. Once the verification stages are complete, the card is activated allowing limited access reader/scanner 501 to information stored on the card via card 100 via a secure data channel 506.

The reader/scanner then obtains the relevant information from the card and forwards it to the relevant authority 505 such as transport authority, police department, government department or agency etc. The relevant authority 505 verifies the information against its records. In addition, the authority 505 may also open a secure communication channel 507 with the issuing authority to ensure that the card is in the possession of the card owner. Once the relevant authority 505 has verified the information, the reader/scanner is advised 510. The reader is then able to append data 508 to the card regarding the event which required the card data to be scanned. In the case of a driver's license for example, it could be the issue of an on the spot fine and loss of points, a caution etc. In the case of the passport, it could be an official entry or exit stamp or necessary visas etc. In each case, the reader 501 also keeps a log of the activity which can be transferred to the relevant authority for analysis. In such cases, the data can be of assistance in tracking people movement etc.

Figure 6:
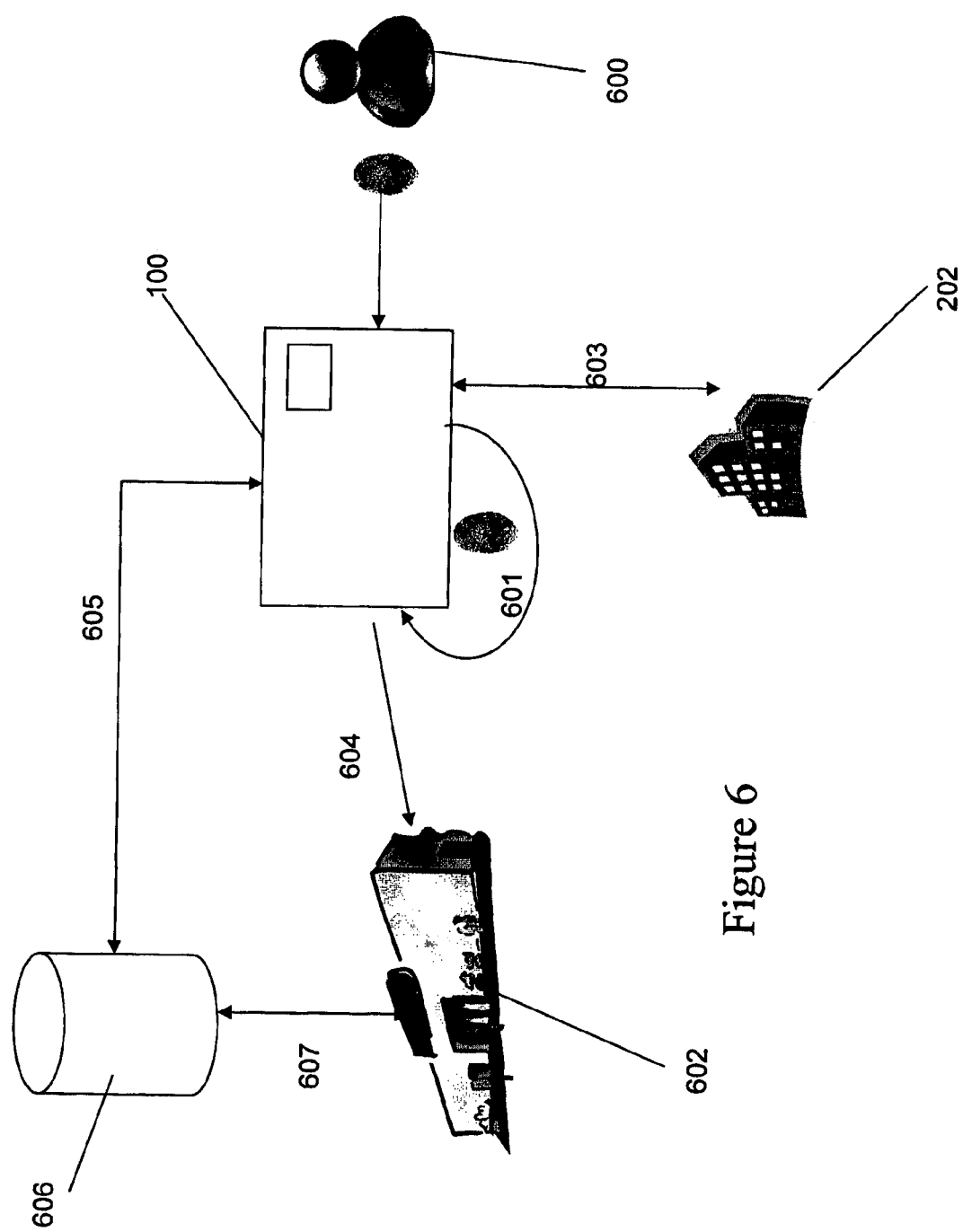
FIG. 6 is a schematic diagram depicting the use of the card as store rewards or credit card.

With reference to FIG. 6, there is illustrated the processes associated with the use of the card as a store loyalty card or store credit card etc. As shown, the user 600 engages the selected digit with the biometric sensor 104 to activate the card 100. The card's processor then verifies the identity 601 of the user 600. If the sample data matches the template data stored on the card the processor then forwards the sample information to the issuing authority 603 for secondary verification. Once the verification stages are complete, the card is activated and the card may then be utilised to initiate the transaction 604 with the issuing store or chain.

The card may then communicate 605 with the store's back end accounting system 606 to verify the user holds an account with the store and that there is sufficient funds on the account to permit the requested transaction. If there are sufficient funds, the store's accounting system authorises the transaction and settlement is effected. In the event that the user does not have sufficient funds in the store account to complete the transaction, the back end accounting system could then advise the card's processor which could then access the user's banking details stored on the card's memory to initiate a transfer from the customers financial institution to the store to provide the required funds to complete the transaction.

Figure 7:
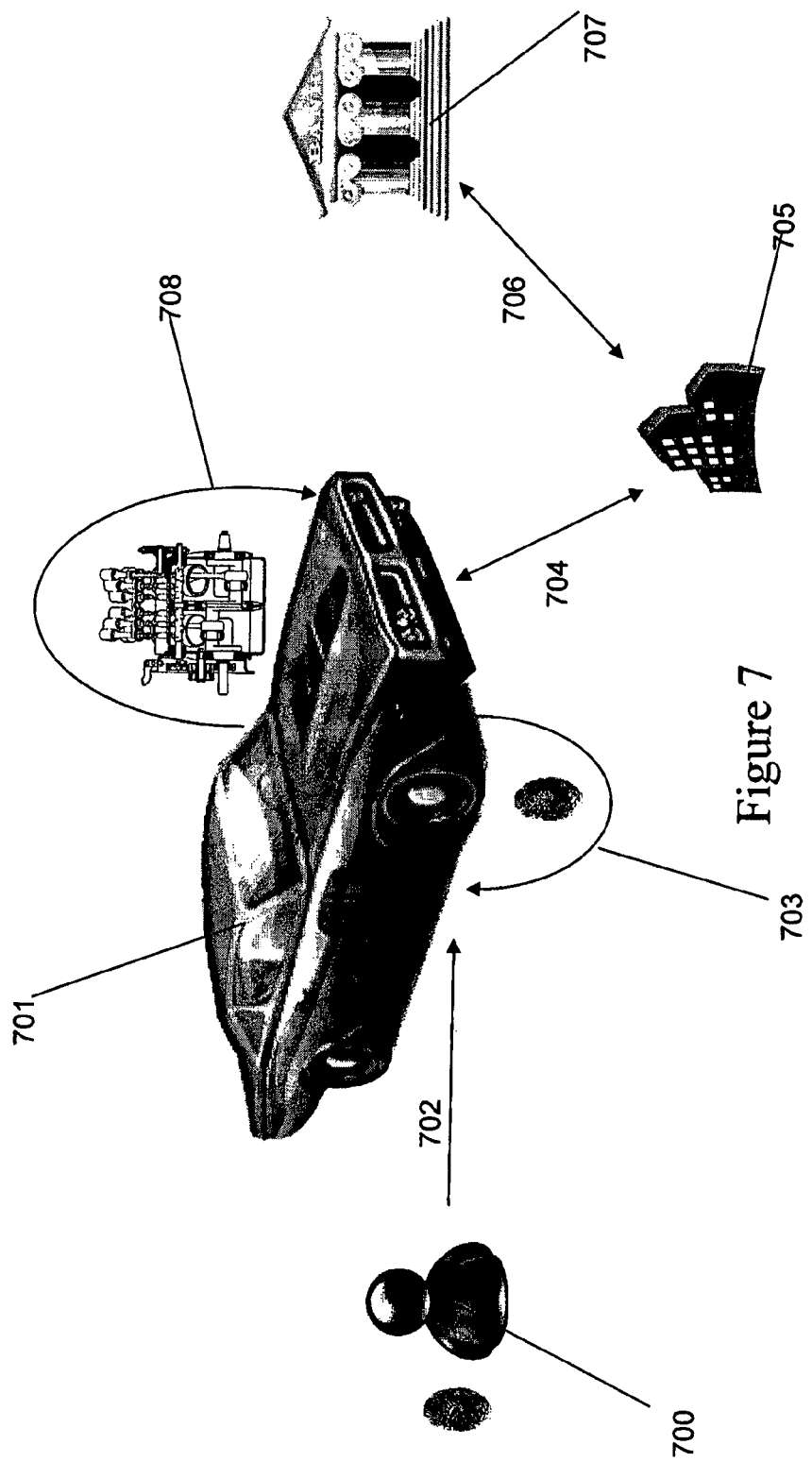
FIG. 7 is a schematic diagram depicting the fraud prevention system of the present invention to permit access to a motor vehicle.

FIG. 7 depicts the use of the fraud prevention system of the present invention to permit access to a motor vehicle. In this example the access control including the processor 101, biometric reader 104 and power system (i.e. inductive element 106 and power unit 105) is incorporated into the vehicles dash or console etc., on the user 700 entering the car 701 the user 700 is required to engage the appropriate digit with the biometric reader 104 to activate the processor 101. The processor then verifies the identity of the user 700. If the sample data matches the template data stored on the processor 101 then the processor 101 forwards the sample information 704 to the issuing authority 705 for secondary verification. At this stage the issuing authority may communicate 706 with relevant public authorities such as the DMV etc. to determine if there are any restrictions or conditions on the user's license etc, for example the user may be a habitual drink driver in such cases the car may be required to be fitted with a breathalyser to take a blood alcohol reading before permitting the ignition of the engine 708.

Once the verification stages are complete, and there are no additional restrictions on the user 700 use of the vehicle then the processor 101 enables the car's ignition system and enables the user to start the engine 708. While in the present example the fraud prevention system has been integrated into the car's interior it will of course be appreciated by those of skill in the art that the biometric reader and processor etc. could be located within the car's key fob and on engagement and verification of the user 700 the system could then unlock the car and enable the engine system.

Figure 8:
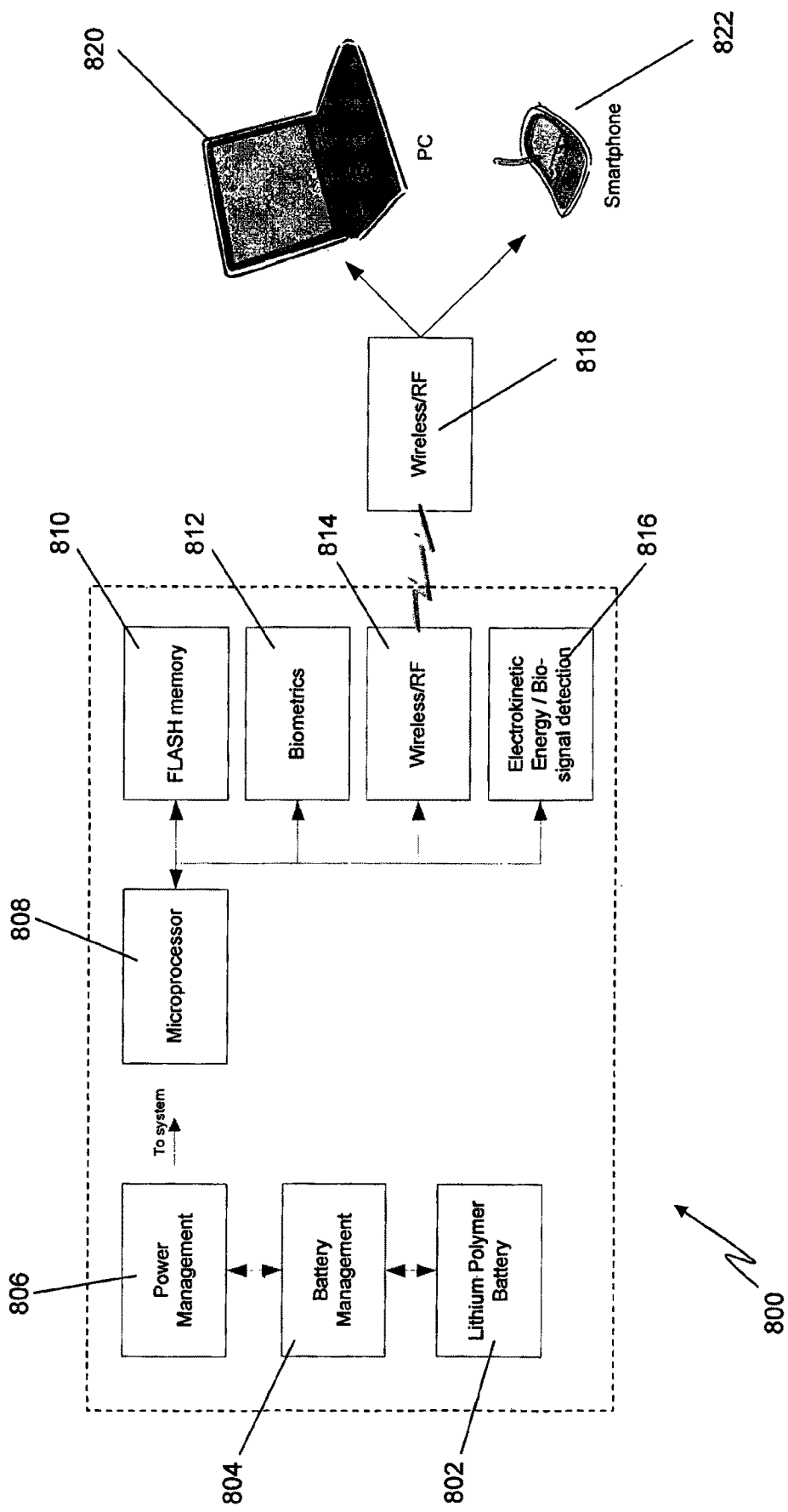
FIG. 8 is a schematic diagram depicting the configuration of a smart card according to another embodiment of the present invention.

FIG. 8 illustrates a system including a smart card 800 according to another embodiment of the present invention.

As illustrated towards the left of FIG. 8, the smart card 800 includes a lithium polymer battery 802 for powering the smart card 800. The battery 802 is coupled to a battery management unit 804 for managing power input to the battery 802 the levels of voltage and current applied to the battery 802 during re-charging and discharge). The battery 802 and battery management unit 804 is also coupled to a power management unit 806 for managing power output from the battery 802 to ensure that a suitable level of voltage and current is drawn from the battery 802 to power the other components of the smart card 800. The smart card 800 is configured to enable re-charging of the battery 802, for example via a USB terminal (not shown).

The smart card 800 also includes a microprocessor 808 coupled to a FLASH memory module 810. The memory module 810 stores the biometric data of the authorised card user. The microprocessor 808 is also coupled to a biometric sensor 812 such as a finger print scanner, a bio-signal detection circuit 816 for detecting a user's contact with the biometric sensor 812 and identifying bio-signals, and a wireless transmitter and receiver unit 814 for sending and receiving a user's biometric data and sending general commands. The wireless transmitter and receiver unit 814 communicates with a wireless transmitter and receiver unit 818 of other devices, such as an EFTPOS terminal, a mobile device 822 and/or a personal computer 820 or the like for carrying out a transaction. The wireless transmitter and receiver units 814, 818 are configured for any suitable wireless communication, such as NFC communication.

At registration of a new card user, the smart card 800 is configured with a new authorised user's biometric data. Elaborating further, a new authorised user's biometric data is obtained by a card issuing authority from the new user (e.g. via a fingerprint scanner or the like). The new authorised user's biometric data is then received by the smart card 800 from the card issuing authority via the wireless unit 814 and saved on FLASH memory 810 of the smart card 800.

During operation, the smart card 800 can switch between a non-active condition and an active condition. In the non-active condition, the smart card 800 is operating in a lower power state (i.e. sleep mode). In the active condition, the smart card 800 is operating in a fully powered state.

When the smart card 800 is in storage (e.g. in the user's wallet), the smart card 800 remains in the non-active condition. When the user wishes to use the smart card 800 to process a transaction, the user places his/her finger in contact with the biometric sensor 812. Upon detection of a user's contact with the biometric sensor 812 by a capacitive sensor of the bio-signal detection circuit 816, the bio-signal detection circuit 816 enables the battery 802 to provide full power to the smart card 800 such that the smart card 800 is switched to active condition. The bio-signal detection circuit 816 then sends a signal to the microprocessor 808 to wake up the microprocessor 808 so that the microprocessor 808 can activate the biometric sensor 812 to initiate a finger print scan of the user's finger. The bio-signal detection circuit 816 is adapted to detect bio-signals on the surface of the skin using the capacitive sensor. For example, the detection of bio-signals can involve Electrocardiography (ECG), Electroencephalography (EEG) and/or Electromyography (EMG).

In the active condition, the microprocessor 808 temporarily saves user data obtained from the finger print scan for comparison with the authorised user's biometric data saved in memory 810. If a match is found, the microprocessor 808 continues to power the smart card 800 until a transaction using the smart card 800 is complete. The smart card 800 is configured to interface with a transaction terminal (e.g. an EFTPOS terminal) using NFC. The smart card 800 can also be configured to interface with a transaction terminal using magnetic stripe, micro-chip technology or any other suitable communications technology.

If no match is found, microprocessor 808 sends a signal to the biometric sensor 812 and bio-signal detection circuit 816, and the power management unit 806 switches off the power supply from the battery 802 so as to reduce power consumption and prevent an unauthorised/fraudulent transaction. Alternatively, if no match is found, the microprocessor 808 disables the biometric sensor 812 and the bio-signal detection circuit 816 switches the smart card 800 back to its non-active condition. When the capacitive sensor of the bio-signal detection circuit 816 detects a subsequent user contact with the biometric sensor 812, the power management unit 806 activates the battery 802 to provide full power to the smart card 800 such that the smart card 800 is switched to operate in the active condition. An interrupt/signal is also sent by the bio-signal detection circuit 816 to wake up the microprocessor 808 such that the microprocessor 808 can initiate a subsequent finger print scan by the biometric sensor 812.

The smart card 800 further includes an LED user interface (not shown) for indicating whether a match has been found between the data obtained from the finger print scan and the authorised user's biometric data saved in memory 810. If a match has been found, the LED user interface flashes green, if no match has been found, the LED user interface flashes red.

The smart card 800 can be designed to conform with physical dimensions described in ISO/IEC CD17839-2.

In a further embodiment, once a match is found between the user data obtained from the finger print scanner and the authorised user's biometric data saved in memory 810, the smart card 800 sends the user data to a remote server for secondary authentication. The smart card 800 can send the user data using the Wi-Fi transmitter 814 interfacing with a Wi-Fi receiver 818 of a PC 820 or other terminal connected to the remote server. The transmitter 814 can communicate with the receiver 818 via any suitable communication means, for example, the transmitter 814 can also be configured to communication with the receiver 818 via NFC or other RF communication means.

In another embodiment, if no match is found between the user data obtained from the finger print scan and the authorised user's biometric data saved in memory 810, the smart card 800 can be configured to send a notification signal to the relevant financial institute to indicate a fraudulent/unsuccessful transaction via the transaction terminal.

In yet another embodiment, the smart card 800 is further configured to measure additional biometric data from a user for secondary authentication of the smart card 800. For example, the smart card 800 can be configured to measure a user's pulse, the level of oxygen saturation (SpO2), haemoglobin and the like. Some biometric sensors which can be used to measure the additional physiological data include a pulse oximeter and a pressure sensor. The physiological biometric data can be used to authenticate the user's identity in addition to the user's finger print information.

In some embodiments, two or more functions of the smart card 800 described above may be provided by a single integrated customised sensor. For example, biometric sensor 812 may be integrated with a bio-signal sensor used in the bio-signal detection circuit 816 to form a single integrated sensor. This configuration advantageously allows the single integrated sensor to detect a bio-signal of interest such as their ECG (heart signal) so as to provide a signal to the bio-signal detection circuit 816 to switch the smart card 800 to its active condition. The same sensor can also record the user's fingerprint for authentication, thereby providing a more compact configuration.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A personal device for storing information about a user, said personal device comprising:
   a biometric sensor for taking a biometric reading from said user through the user making physical contact with the biometric sensor;
   an inductive element disposed with the biometric sensor for the generation of an electrical charge when the inductive element is in proximity to the user's physical contact to receive an induced charge present in the user;
   a power unit coupled to the inductive element, the power unit having at least one of a voltage amplifier or a current amplifier to amplify the electrical charge from the inductive element; and
   at least one processor, wherein the at least one processor is powered by the electrical charge of the inductive element, which activates the processor to analyse the biometric reading obtained from the biometric sensor to verify that the user is an authorised user and prohibit usage of the personal device in the event that the user is not an authorised user, wherein the biometric sensor is a finger print scanner, wherein the processor verifies the user's identity by comparing fingerprint data obtained from the finger print scanner with template data obtained from the authorised user, wherein the template data is encrypted onto the processor.

2. The personal device of claim 1, wherein the personal device further includes a memory module coupled to the processor.

3. The personal device of claim 2, wherein the memory contains personal data associated with the authorised user.

4. The personal device of claim 1, wherein the personal device further includes a communications module coupled to the processor.

5. A personal device for storing information about a user, the personal device comprising:
   a biometric sensor for taking a biometric reading from the user through the user making physical contact with the biometric sensor;
   an inductive element disposed with the biometric sensor for the generation of an electrical charge when the inductive element is in proximity to the user's physical contact to receive an induced charge present in the user;
   a power unit coupled to the inductive element, the power unit having at least one of a voltage amplifier or a current amplifier to amplify the electrical charge from the inductive element; and
   at least one processor, wherein the at least one processor is powered by the electrical charge of the inductive element, which activates the processor to analyse the biometric reading obtained from the biometric sensor to verify that the user is an authorised user and prohibit usage of the personal device in the event that the user is not an authorised user, wherein the personal device further includes a communications module coupled to the processor, wherein the processor is adapted to transmit the biometric reading via the communications module to the personal device's issuing authority for secondary verification.

6. The personal device of claim 5, wherein the user is required to maintain contact with the personal device to utilise the personal device to complete the desired transaction.

7. The personal device of claim 5 wherein the personal device comprises a card.

8. A personal device for storing information about a user, the personal device comprising:
   a biometric sensor for taking a biometric reading from the user through the user making physical contact with the biometric sensor;
   an inductive element disposed with the biometric sensor for the generation of an electrical charge when the inductive element is in proximity to the user's physical contact to receive an induced charge present in the user;
   a power unit coupled to the inductive element, the power unit having at least one of a voltage amplifier or a current amplifier to amplify the electrical charge from the inductive element; and
   at least one processor, wherein the at least one processor is powered by the electrical charge of the inductive element, which activates the processor to analyse the biometric reading obtained from the biometric sensor to verify that the user is an authorised user and prohibit usage of the personal device in the event that the user is not an authorised user, wherein the personal device further includes a communications module coupled to the processor, wherein the processor is adapted to transmit the biometric reading via the communications module to a mobile device or personal computer.

9. The personal device of claim 8, wherein the communications module includes a wireless transmitter.

10. The personal device of claim 8, further including a biosignal detection circuit for detecting the user's contact with the biometric sensor.

11. A system for the secure transfer of information for a plurality of subscribers, the system including:
   a central server and a plurality of personal devices, each of the plurality of personal devices being a personal device for storing information about a user, the personal device comprising:
   a biometric sensor for taking a biometric reading from the user through the user making physical contact with the biometric sensor;
   an inductive element disposed with the biometric sensor for the generation of an electrical charge when the inductive element is in proximity to the user's physical contact to receive an induced charge in the user;
   a power unit coupled to the inductive element, the power unit having at least one of a voltage amplifier or a current amplifier to amplify the electrical charge from the inductive element; and
   at least one processor, wherein the at least one processor is powered by the electrical charge of the inductive element, which activates the processor to analyse the biometric reading obtained from the biometric sensor to verify that the user is an authorised user and prohibit usage of the personal device in the event that the user is not an authorised user,
   wherein the personal device further includes a communications module coupled to the processor,
   wherein the processor is adapted to transmit the biometric reading via the communications module to the personal device's issuing authority for secondary verification,
   wherein each of the plurality of personal devices is associated with a subscriber on registration with the system and wherein
   the server is adapted to:
      obtain the biometric reading for a given subscriber;
      generate from the biometric reading, template data for the given subscriber;
      encrypt the template data; and
      write the encrypted template data to a processor of the personal device.

12. The system according to claim 11, wherein the processor of the personal device is operable on contact by a user with the biometric sensor, the processor being adapted to obtain the biometric reading from the biometric sensor, to verify that the user is the subscriber associated with the personal device and prohibit further usage of the personal device in the event that the user is not the subscriber who was issued the personal device and whereon verification, the user is the subscriber associated with the personal device transmit the biometric reading to the central server for secondary validation by comparison to the template data.

* * * * *